United States Patent [19]
Fukumoto et al.

[11] Patent Number: 5,069,960
[45] Date of Patent: Dec. 3, 1991

[54] SKIN-SURFACED FOAM GLASS TILE

[75] Inventors: Katsuhisa Fukumoto, Tokoname; Kiyotaka Kawanishi, Nagoya; Ryo Nakada, Tsuchiura; Junpei Yamano, Nagoya, all of Japan

[73] Assignee: Inax Corporation, Japan

[21] Appl. No.: 642,072

[22] Filed: Jan. 16, 1991

Related U.S. Application Data

[63] Continuation-in-part of Ser. No. 235,372, Aug. 23, 1988.

[30] Foreign Application Priority Data

Aug. 26, 1987 [JP] Japan .................... 62-212457
Aug. 27, 1987 [JP] Japan .................... 62-213673
Aug. 27, 1987 [JP] Japan .................... 62-213674

[51] Int. Cl.$^5$ .................... B32B 18/00; B32B 5/14; B32B 3/26
[52] U.S. Cl. .................... 428/310.5; 428/49; 428/312.2; 428/312.6; 428/314.4; 428/316.6; 428/318.6; 428/319.1
[58] Field of Search .................... 428/49, 310.5, 312.2, 428/312.6, 312.8, 314.4, 314.8, 316.6, 318.6, 319.1

[56] References Cited

U.S. PATENT DOCUMENTS

| | | | |
|---|---|---|---|
| 3,330,627 | 7/1967 | McCormick et al. | 428/312.6 |
| 3,646,180 | 2/1972 | Winnick | 428/49 |
| 4,395,456 | 7/1983 | Jackson et al. | 428/312.6 |
| 4,430,108 | 2/1984 | Hojaji et al. | 428/312.6 |
| 4,756,956 | 7/1988 | Nagai et al. | 428/312.2 |

FOREIGN PATENT DOCUMENTS

| | | | |
|---|---|---|---|
| 51-61127 | 5/1976 | Japan | 428/312.6 |
| 51-61128 | 5/1976 | Japan | 428/312.6 |
| 58-104075 | 6/1983 | Japan | 428/312.6 |

Primary Examiner—William J. Van Balen
Attorney, Agent, or Firm—Lerner, David, Littenberg, Krumholz & Mentlik

[57] ABSTRACT

A thermally insulating foam glass tile includes a tile-like body consisting essentially of a vitrifiable mineral and having a substantially closed cell structure, and a rigid reinforcing vitrified surface skin permeated into at least the top surface of the tile-like body. An intermediate vitrified layer having a lesser volume of closed cells may be integrally melt-bonded between the tile-like body and the surface skin.

16 Claims, 2 Drawing Sheets

SKIN-SURFACED FOAM GLASS TILE

CROSS-REFERENCED TO RELATED APPLICATIONS

This application is a continuation-in-part of application Ser. No. 07/235,372 filed Aug. 23, 1988.

BACKGROUND OF THE INVENTION

1. Field of the Invention

The present invention relates to a heat-insulating foam glass tile having a beautiful strong skin layer at least on the top surface thereof and to a method for producing same.

2. Prior Art

Thermally insulating materials such as foamed plastics, glass wool or rock wool have been applied to the outside or inside of buildings, and after such application these insulating materials have been covered with surface materials. Because such insulating materials are weak, heavy decorative products such as tile cannot be used to cover the insulating materials, necessitating the use of lightweight surface materials which are less decorative.

Attempts have been made to use decorative thermally insulating foam glass tile as the outside covering material of buildings. Such conventional foam glass pieces have poor strength, especially surface strength, and are therefore not practical. The poor strength of these pieces may be increased by applying a strong glaze layer 100 on such a foam glass body 102 as shown in FIG. 5.

The glazed foam glass pieces 104 which result, however, have serious disadvantages as summarized below:

1. The glaze layer needs to be thick to prevent it from developing cracks, pinholes and unevenness as the glaze is elongated in all directions when the foam glass body is expanded during the course of production.
2. The step of forming such thick glaze layers is troublesome and complicated. Although thick glaze coating is carried out more easily when powder glaze materials are used rather than wet glaze materials, there are still drawbacks such as, for instance, the need for complicated application apparatus, the likelihood that the glaze layer will peel off and the difficulty in applying the glaze onto complicated surfaces.
3. The glaze layer 100 is likely to shrink while the foam glass body 104 expands during the course of firing, thereby causing deformation of the foam glass pieces, such as by warping, and a decrease in the strength of the glaze layer due to stress.
4. Since the glaze layer has good thermal conductivity and is comparatively heavy, the thick glaze layer decreases the thermal insulating capability of the foam piece and increases the weight thereof.
5. Foam glass pieces having a thick glaze layer have very poor thermal shock resistance when subjected to a sudden change in temperature because the glaze layer and foam glass body have significantly different heat capacities and thermal conductivities.
6. It is difficult to apply a thick glaze layer onto a foam glass body having complicated surface structures.

SUMMARY OF THE INVENTION

The main object of the present invention is to provide a heat-insulating skin-surfaced foam glass tile and a method for producing same, wherein the above-mentioned problems have been eliminated.

Other objects and features of the present inventions will become apparent in the following descriptions and drawings.

According to the present invention, there is provided a method for producing a heat-insulating skin-surfaced foam glass tile from vitrifiable mineral particles, which method comprises the steps of molding a material consisting essential of a vitrifiable mineral and an effective amount of a foaming agent into a tile-like block, coating at least a top surface of the block with a thin layer comprising a vitrifying agent for the mineral material, heating the coated block to a temperature sufficient to fuse the coated layer whereby the molten vitrifying agent permeates into the coated surface of the block (i.e. with a gradually decreasing transition of the vitrifying agent) to form a secondary layer consisting of the vitrifying agent and the vitrifiable mineral and softens the vitrifiable mineral in the secondary layer, further heating the coated block to a temperature sufficient for softening the vitrifiable mineral and decomposing the foaming agent, and cooling the foamed tile-like block, whereby a rigid reinforcing skin layer consisting essentially of a vitrified mixture of the vitrifiable mineral and the vitrifying agent is formed at the coated and permeated surface of the resulting foam glass tile.

In the above-described method, the molded tile-like block may further include a thin layer consisting essentially of a vitrifiable mineral and a lesser amount of a foaming agent applied to at least the top surface thereof. The thin layer containing the lesser amount of the foaming agent is applied, for example by spraying, onto at least the top surface and, as desired, onto the surfaces of the molded tile-like block where the thin layer comprising the vitrifying agent is to be coated. In other words, the tile-like block coated with a vitrifying agent layer is prepared by molding a material consisting essentially of a vitrifying mineral and an effective amount of a foaming agent into a tile-like block; applying a layer consisting essentially of a vitrifying mineral containing a foaming agent in an amount (e.g., about 5–60 percent by weight) less than the effective amount, onto at least the top surface of the molded block; and coating thereon a layer of the vitrifying agent.

Thus, in accordance with the above-described methods, there is obtained a heat-insulating skin-surfaced foam glass tile having a substantially closed cell structure comprising, a foam glass tile body, preferably having a thin intermediate rigid layer of less foamed glass at least on the top surface thereof, and a rigid reinforcing skin layer consisting essentially of a vitrified mixture of a vitrifiable mineral and a vitrifying agent, the skin layer being integrally melt-bonded onto at least the top surface of the foam glass tile body or the foam glass tile body having the intermediate layer.

It is generally desirable that the skin layer have a thermal expansion coefficient similar to and preferably substantially the same as that of the foam glass body or the intermediate layer.

DETAILED DESCRIPTION OF THE PREFERRED EMBODIMENTS

(1) Vitrifiable Mineral Particles

Figure 1:
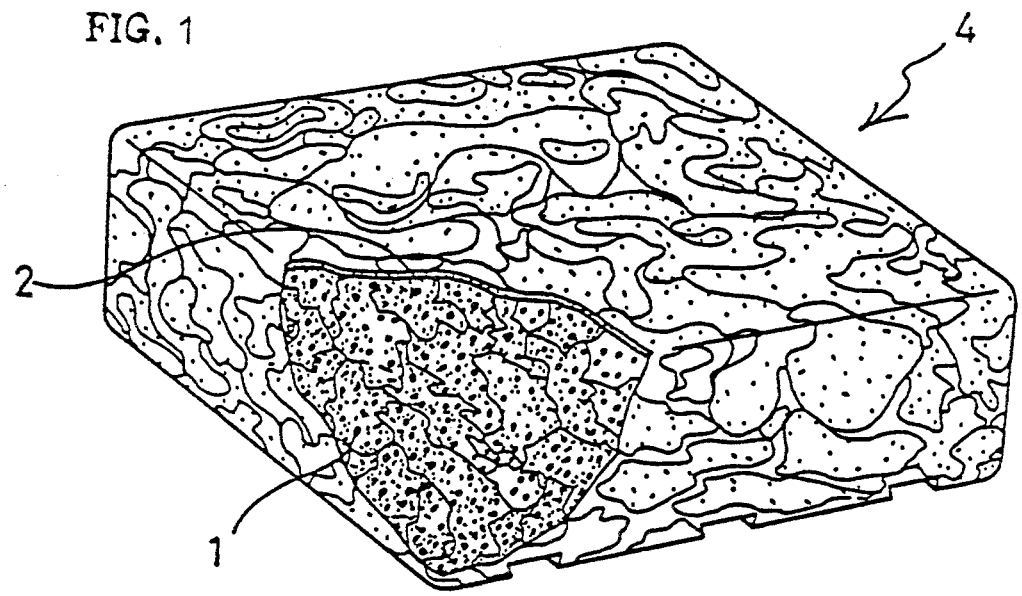
FIG. 1 is a perspective view of a foam glass tile 4 having a surface skin according to the present invention, partly broken away to show the interior structure thereof.

The vitrifiable mineral particles for producing the foam glass tile are powder or fine granules of natural minerals which soften at a firing temperature of about 700° C. to about 1300° C. or more. Such vitrifiable minerals include, for example, liparite (e.g., kokaseki in Japanese), rhyolite, pearlite, obsidian, volcanic ash and other vitrifiable igneous rocks. These minerals are generally pulverized into a powder having a mean particle size of less than 1 mm, preferably 0.5 mm or less, and typically less than about 0.2 mm.

(2) Vitrifying Agent For The Mineral Particles

The vitrifying agents preferably having a melting temperature lower than the softening or melting temperature of the vitrifiable mineral particles and are capable of readily fusing the vitrifiable mineral. When a tile-like block including the vitrifiable mineral particles is coated with such a vitrifying agent and heated to the fusing temperature of the vitrifying agent, the molten vitrifying agent permeates into the coated surface of the block, lowering the softening temperature of the vitrifiable mineral with which it comes in contact by about 100° C. or more, and preferably about 150°–300° C., as compared to the normal softening temperature of the vitrifiable mineral.

Thus, when the coated tile-like block is subsequently heated to a higher temperature and then cooled, a rigid reinforcing surface layer consisting of the vitrified mixture of the vitrifiable mineral and the vitrifying agent is formed on the coated surface of the resulting foam glass tile body.

Vitrifying agents include, for example, inorganic powder compounds of an alkali metal (e.g., sodium, potassium and lithium); inorganic powder compounds of an alkaline earth metal (e.g., calcium and magnesium); inorganic glass powder containing an alkali metal, alkaline earth metal or boron component; inorganic water glass containing an alkali metal component; and mixtures thereof. The vitrifying agents typically have a softening or melting temperature of about 300° C. to about 1000° C. or more.

The vitrifying agents are typically used alone or in combination with a vitrifiable mineral, preferably of the type used in the tile-like block or in the intermediate layer on the block. When used in combination with a vitrifiable mineral, about 10 percent by solid weight or more of the vitrifying agent is mixed with about 90 percent by solid weight or less of the vitrifiable mineral.

Typically, an aqueous suspension of the vitrifying agent is applied (for example, by spraying) to the top surface, and as necessary the side surfaces, of the molded tile-like block or the intermediate layer-coated tile-like block before firing. The quantity to be applied is generally in the range of about 3–50 mg on a dry basis (about 5–75 mg on a wet basis) and normally about 6–25 mg on a dry basis (about 10–40 mg on a wet basis) per square centimeter of the surface of the molded tile-like block to be coated. Incidentally, the vitrifying agent should be clearly distinguished from a conventional glazing agent, because the glazing agent is applied in a quantity of 60–120 mg on a dry basis and 100–200 mg on a wet basis per square centimeter of the surface of such molded blocks to be glazed, and the resulting glaze layer often creates cracks, pinholes and other defects as described above due to the expansion of the molded block as it is foamed.

(3) Foaming Agent

The foaming agent is generally an inorganic compound which decomposes to generate a foaming gas at the softening temperature of the vitrifiable mineral particles, and is used in a quantity of generally about 0.02–2 percent by weight of the vitrifiable mineral, and normally about 0.1–1 percent by weight of the vitrifiable mineral, quantities in the range of about 0.02–2 percent being referred to herein as an effective amount. Such foaming agents include, for example, silicon carbide, silicon nitride, carbon, gypsum, inorganic carbonates, and mixtures thereof. In the present invention, silicon carbide or a mixture including silicon carbide is normally preferred in view of its melt viscosity and the fact that it forms closed cells in the foam glass body.

(4) Molded Tile-Like Block

A mixture of the vitrifiable mineral particles and the effective amount of the foaming agent is molded into tile-like blocks by means of compression, wet extrusion, or other methods such as cast molding. The mixed materials generally contain a pigment for coloring the resulting foam glass tile.

In a preferred embodiment, densified particles of the mixed materials having mean sizes of about 0.05–0.50 mm are advantageously used to obtain more uniformly expanded foam glass tiles having dimensional stability. Such densified particles which have good flowability and pack uniformly can be produced by mixing the above-mentioned materials in the presence of water or an aqueous binder solution, compressing the mixed material into lumps, and then pulverizing the lumps into powder.

(5) Intermediate Layer Coated On The Molded Block

In a preferred embodiment, at least the surface of the above-described molded tile-like block is coated with a thin layer consisting essentially of a vitrifiable mineral and a lesser amount of a foaming agent, the types of these materials being normally the same as those used in the block. The thin layer is applied by spraying or curtain-coating an aqueous mixture of the materials onto the top surface of the molded block and, as desired, onto side surfaces thereof. Alternatively, powder materials can be compression-molded.

The mixed materials will typically also include a pigment so that the intermediate layer forms a colored layer over the foam glass tile. In such cases, it is not necessary that the molded block itself contain a pigment, although a pigment of the same or different color may be included if desired. The thickness of the thin coated layer is generally about 3 mm or less to produce a rigid reinforcing intermediate layer of about 3 mm or less after the celluation which occurs during firing. The amount of the foaming agent to be used is generally about 3–70 percent and preferably about 5–60 percent by weight of the quantity to be used in the molded tile-like block. The intermediate layer not only prevents formation of pinholes in the vitrified surface skin, but also reinforces the foam glass tile.

(6) Firing Of The Coated Tile-Like Blocks

The molded tile-like block coated with a thin layer including the vitrifying agent is gradually heated in a tunnel kiln, a roller hearth kiln, or other transportation-type kiln to a temperature sufficient to soften the vitrifiable mineral and decompose the foaming agent. The firing temperature depends on the types of the vitrifiable minerals and foaming agents used, and is normally lower than about 1300° C. For example, the firing cycle can be carried out in about 24 hours and at a maximum temperature of 1180° C. for one hour in the case of a tunnel kiln; and for about 3–8 hours depending on the thickness of the resulting foam glass tile in the case of a roller hearth kiln. By passing the coated block through such kilns, the coated block is readily heated to a temperature for fusing the vitrifying agent, and then to a temperature for softening the vitrifiable mineral and decomposing the foaming agent.

Figure 3:
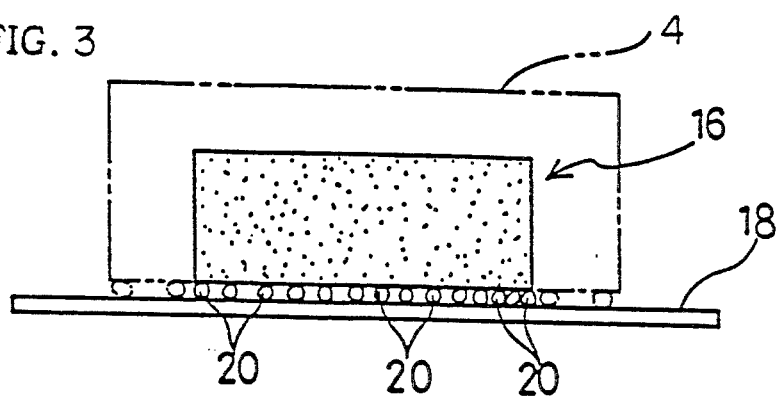
FIG. 3 is a schematic side view showing the use of refractory granules as runner granules 20 between a tile-like block 16 and a firing stand 18 in a firing step according to the present invention.

As illustrated in FIG. 3, when the molded tile-like block 16 is placed on a stand 18 and fired in a kiln, refractory inorganic granules 20 having a diameter of about 0.50–5 mm (e.g., a mean size of about 1.5 mm) are preferably used between the molded block 16 and the firing stand 18. The action of the runner or slide granules 20 permits the molded block to be smoothly foam-expanded to about twice its surface area in all directions with less friction. Thus, a uniformly expanded dimensionally stable foam glass tile 4 is readily obtained without the use of a covering mold.

(7) The Foam Glass Tile Having A Surface Skin

The foam glass tile produced according to the method of the present invention has a thin rigid surface skin layer consisting essentially of a vitrified mixture of a vitrifiable mineral and a vitrifying agent which is melt-bonded integrally onto at least the top surface of the foam glass tile body. The thickness of the vitrified skin layer is generally about 0.05–1.0 mm and preferably about 0.1–0.5 mm. It should be noted that a vitrified layer consisting of the vitrifying agent alone does not substantially exist over the surface skin. Even if such a vitrifying layer does exist, it may have a thickness of less than 0.1 mm and include pinholes, which is clearly distinguishable from a conventional glaze layer. As is obvious from the foregoing description, the molten vitrifying agent permeates with a gradually decreasing transition thereof into the coated surface of the block body and softens the vitrifiable mineral of the permeated mixture layer. Thus, the resulting rigid skin layer is provided with a skin structure having a gradual decrease from the skin surface of the vitrifying agent component and is melt-bonded onto the foam glass body or the intermediate foamed glass layer without a substantially distinct boundary between them. The skin-surfaced foam glass tile has a closed cell structure and a decorative tile design, and is strong, lightweight, and heat and noise insulating, thereby making it suitable as an outdoor tile for buildings and the like. Of course, the foam glass tile can also be used as an indoor tile for walls and ceilings.

Other features of the method of the present invention and the resulting skin-surfaced tile are summarized as follows:

(1) it can be readily produced, even where the tiles have complicated surface structures;
(2) stresses developed during firing do not cause deformation of the tile or a decrease in the strength thereof;
(3) the tile has good resistance to thermal shock;
(4) the skin layer does not compromise the light weight of the tile or its desirable thermal insulating properties;
(5) the appearance of the tile does not substantially change even when some of the skin layer is accidentally scratched off; and
(6) by forming the tile with a thin intermediate rigid layer of less foamed glass, the strength of the resultant skin-surfaced tile will be increased and the amount of pinholes therein will be reduced. Should one attempt to produce a tile having a surface skin by first producing a foam glass body and then coating a skin layer thereon, the vitrifying agent would fail to permeate into the foam glass body at a low firing temperature of about 800° C., the deformation and open cell structure taking place in the foam glass body at a high firing temperature of about 1200° C., and both of the above-mentioned defects more or less occurring during firing between these temperatures.

The skin-surfaced foam glass tile of the present invention has a density of about 0.2–1.3 gm/cc and typically about 0.3 gm/cc. Before firing, the tile-like block has a density of about 1.5 gm/cc.

(8) Installation Of The Foam Glass Tile

Figure 4:
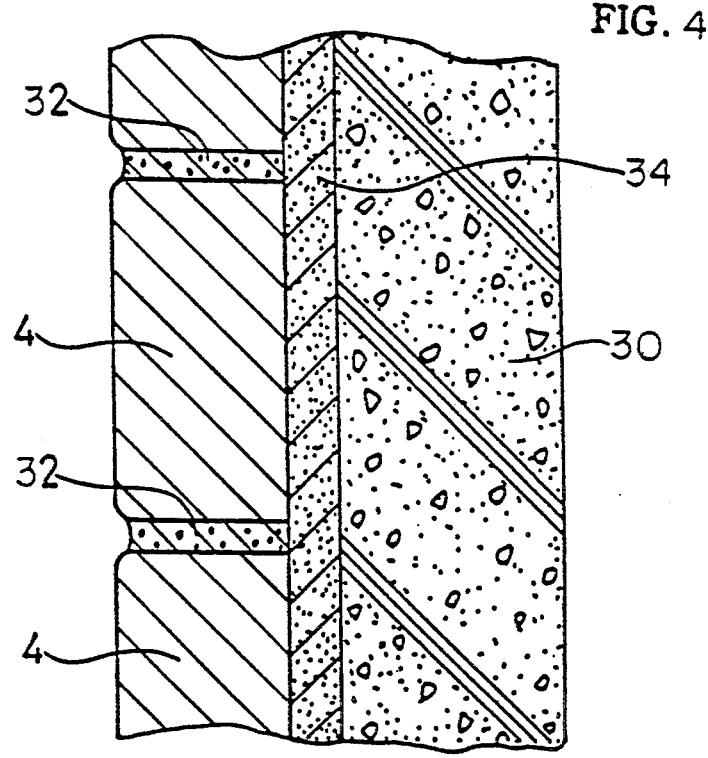
FIG. 4 is a cross-sectional view showing the installation of the present foam glass tiles 4 on a wall 30 with a heat-insulating joint paste 32 disposed between the foam glass tiles 4.
Figure 5:
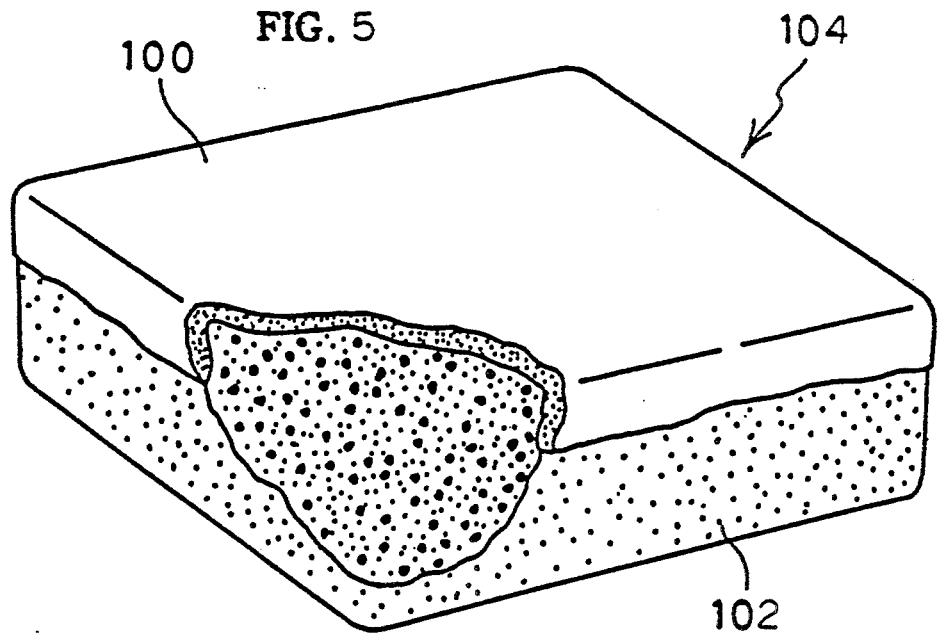
FIG. 5 is perspective view of a conventional foam glass block 104 having a comparatively thick glaze layer 100 thereon, and partly broken away to show the interior structure thereof.

As illustrated in FIG. 4, a plurality of the foam glass tiles 4 are installed with cement mortar 34 with suitable joint intervals (e.g., several millimeters) on a substrate such as a wall 30. According to a preferred method of installation, the joint intervals between the installed tiles are filled with a thermally insulating joint paste 32 so that the thermal insulating properties of the installed tiles 4 can be fully realized. The thermally insulating joint paste 32 contains an effective amount of cellular aggregate in cement mortar. Such cellular aggregate includes, for example, inorganic aggregates such as pearlite, vermiculite, furnace slag, volcanic valloon and volcanic ash, and organic aggregates such as foamed polystyrene beads. For example, such joint paste comprises by weight about 35–55 parts of pearlite aggregate, 100 parts of Portland cement, 1 part of pigment, and 3 parts of cement auxiliaries on a dry basis.

The following examples illustrate certain features of the invention as described above.

EXAMPLE I

The natural vitrifiable mineral particles used were a mixture of 20 percent by weight of liparite of Japanese origin and 80 percent by weight of volcanic ash, the mixture having a chemical composition (in weight percent) of $SiO_2$ - 75.4; $Al_2O_3$ - 12.2; $Fe_2O_3$ - 1.0; CaO - 0.8; $K_2O$ - 4.2; $Na_2O$ - 3.6; $TiO_2$ - 0.1; and trace amounts of MgO, with a loss on ignition of 2.9 weight percent. The vitrifying agent used was a borosilicate glass powder having a softening point of 585° C. and a chemical composition (in weight percent) of $SiO_2$ - 65.9; $Al_2O_3$ - 4.1; $B_2O_3$ - 18.3; ZnO - 3.2; CaO - 1.5; MgO - 0.1; $K_2O$ - 1.7; and $Na_2O$ - 5.2. Incidentally, it has been found that borosilicate glass is very useful because it substantially lowers the softening temperature of the vitrifiable mineral particles and the resultant mixture has substantially the same thermal expansion coefficient as the foam glass body formed from the mineral particles.

The mixture of the above-mentioned mineral particles was pulverized by crushing and milling into a powder having a mean particle size of about 15 microns, followed by addition thereto of 0.18 percent by weight of a silicon carbide foaming agent. The resulting mixture was compression molded into a 120×120×40 mm thick tile-like block.

A vitrifying agent composition was prepared by milling together 100 parts by weight of the above-described borosilicate glass powder, 5 parts of quartz kaolin clay, and 70 parts of water for a period of 10 hours. The composition was applied by spray coating about 20 mg per square centimeter on a wet basis onto the top surface of the tile-like block. The coated block was fired in a tunnel kiln for a total of 24 hours, at a maximum temperature of 1180° C. for 1 hour, to produce a 180×180×60 mm thick foam glass tile 4 consisting of a foam glass body 1 and a surface skin 2, as shown in FIG. 1. The surface hardness and strength of the surface skin 2 were higher than those of the foam glass body 1. The thermal shock resistance of the surface skin was substantially the same as that of the foam glass body.

EXAMPLE II

Example I was repeated, except that the vitrifying agent composition was formulated from 18.9 parts of the borosilicate glass powder, 78.5 parts of the above-described vitrifiable mineral mixture containing no foaming agent, 1.3 parts of quartz kaolin clay, 1.4 parts of gypsum and 76.0 parts of water, all on a weight basis. The composition was applied by spray coating about 30 mg per square centimeter on a wet basis onto the top surface of the tile-like block. After firing as above, the strength and smoothness of the resulting surface skin 2 were better than those obtained in Example I.

EXAMPLE III

Example I was again repeated, except that the vitrifying agent consisted of a water glass (aqueous sodium silicate No. 3 according to Japanese Industrial Standards) having a chemical composition as follows (in weight percent): $SiO_2$ about 29; $Na_2O$ about 10; Fe 0.02 or less; water insolubles 0.2 or less; and balance of water. The vitrifying agent was applied by spray coating about 37 mg per square centimeter on a wet basis onto the top surface of the tile-like block. After firing as above, the resulting skin-surfaced foam glass tile was substantially the same as the tile obtained in Example I.

EXAMPLE IV

Figure 2:
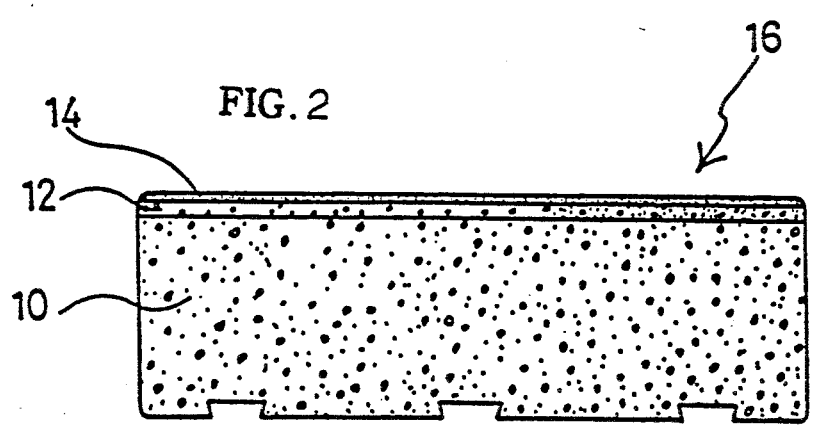
FIG. 2 is a cross-sectional view of a foam glass tile 16 having a thin intermediate rigid layer 12 between the surface skin 14 and the foam glass body 10, according to another embodiment of the present invention.

The materials used for the intermediate layer 12 of the foam glass tile 16, as illustrated in FIG. 2, were (A) the vitrifiable mineral particle mixture defined in Example I in combination with 0.01 weight percent of a SiC foaming agent; (B) the vitrifiable mineral particle mixture defined in Example I in combination with 0.03 weight percent of a SiC foaming agent; or (C) the vitrifiable mineral particle mixture as defined in Example I in combination with 0.06 weight percent of a SiC foaming agent.

The process of Example II was repeated, except that either intermediate layer material (A), (B) or (C) was spray-coated onto the tile-like block (120×120×40 mm) to form a coated layer approximately 2 mm thick. Thus, a skin-surfaced foam glass tile 16 was formed having dimensions of about 180×180×60 mm thick and consisting of a foam glass body 10, an intermediate layer 12 and a rigid surface skin layer 14.

The resulting skin-surfaced tiles (A), (B) and (C) exhibited no pinholes in the surface skin layers. The thermal shock test, evaluated by measuring the difference in temperature between the cooling water and the surface temperature of the foam glass tile when cracks occur, resulted in a temperature difference of 50° C. or higher in the case of tile (A), and a difference of 100° C. or more in the case of tiles (B) and (C). The tile obtained in Example II exhibited some pinholes in its surface skin, and the thermal shock test thereof resulted in a temperature difference of 100° C. or more.

What is claimed is:

1. A thermally insulating foam glass tile comprising, a tile-like body consisting essentially of a first vitrifiable mineral and having a first volume of closed cells, and
a rigid reinforcing skin layer consisting essentially of a vitrified mixture of said first vitrifiable mineral and a vitrifying agent for said first vitrifiable mineral permeated into at least a top surface of said tile-like body.

2. The foam glass tile as claimed in claim 1, wherein there is a gradual transition from said skin layer to said tile-like body.

3. The foam glass tile as claimed in claim 1 wherein said skin layer contains between about 3 mg/cm² and about 50 mg/cm² of said vitrifying agent on a dry basis.

4. The foam glass tile as claimed in claim 1 wherein said skin layer has a thickness of between about 0.05 mm and about 1 mm.

5. The foam glass tile as claimed in claim 1, wherein said tile-like body has a predetermined coefficient of thermal expansion and said skin layer has a coefficient of thermal expansion substantially equal to said predetermined coefficient of thermal expansion.

6. The foam glass tile as claimed in claim 1, wherein said vitrifying agent comprises a borosilicate glass powder.

7. The foam glass tile as claimed in claim 1, wherein said tile-like body further includes a coloring pigment.

8. The foam glass tile as claimed in claim 1 further comprising an intermediate layer integrally melt-bonded between said tile-like body and said skin layer, said intermediate layer consisting essentially of a second vitrifiable mineral and having a volume of closed cells less than said first volume.

9. The foam glass tile as claimed in claim 8, wherein said intermediate layer has a thickness of up to about 3 mm.

10. The foam glass tile as claimed in claim 8, wherein said tile-like body has a predetermined coefficient of thermal expansion and said skin layer has a coefficient of thermal expansion substantially equal to said predetermined coefficient of thermal expansion.

11. The foam glass tile as claimed in claim 8, wherein said vitrifying agent comprises a borosilicate glass powder.

12. The foam glass tile as claimed in claim 8, wherein said intermediate layer further includes a coloring pigment.

13. A tile installation comprising,
a substrate,
a plurality of foam glass tiles installed on said substrate to form joint intervals between adjacent tiles, each of said plurality of foam glass tiles comprising a tile-like body consisting essentially of a first vitrifiable mineral and having a first volume of closed cells and a rigid reinforcing skin layer consisting essentially of a vitrified mixture of said first vitrifiable mineral and a vitrifying agent for said first vitrifiable mineral permeated into at least a top surface of said tile-like body, and
a heat-insulating joint paste containing a cellular aggregate disposed in said joint intervals.

14. The tile installation as claimed in claim 13 wherein there is a gradual transition from said skin layer to said tile-like body.

15. The tile installation as claimed in claim 13 further comprising, an intermediate layer integrally melt-bonded between said tile-like body and said skin layer, said intermediate layer consisting essentially of a second vitrifiable mineral and having a volume of closed cells less than said first volume.

16. The tile installation as claimed in claim 15, wherein said intermediate layer further includes a coloring pigment.

* * * * *